United States Patent [19]

Taylor

[11] 4,291,616

[45] Sep. 29, 1981

[54] ROASTER TRAY

[76] Inventor: Alexander P. Taylor, 3108 Fairview Ave., Parkersburg, W. Va. 26101

[21] Appl. No.: 38,803

[22] Filed: May 14, 1979

[51] Int. Cl.³ .............................................. A47J 27/00
[52] U.S. Cl. ........................................ 99/446; 99/450; D7/130
[58] Field of Search .............. D7/85, 94, 130; 99/446, 99/450, 444, 445, 400, 413, 425; 126/348

[56] References Cited

U.S. PATENT DOCUMENTS

| | | | |
|---|---|---|---|
| 86,923 | 2/1869 | Isham | 99/445 |
| 3,292,528 | 12/1966 | Myler | 99/446 |
| 3,691,937 | 9/1972 | Meek | 99/446 |
| 3,972,318 | 8/1976 | Lenoir | 99/446 |

FOREIGN PATENT DOCUMENTS

| | | | |
|---|---|---|---|
| 366558 | 1/1923 | Fed. Rep. of Germany | 99/446 |
| 1319444 | 1/1963 | France | 99/450 |

Primary Examiner—Billy J. Wilhite

[57] ABSTRACT

The Roaster Tray relates to a cooking device utilized in the process of roasting or baking meats or poultry or other foods plus a further utilization of a part of the device as a tray useful in the serving or carving of the prepared food.

The device comprises two parts, namely a supporting vessel and an improved tray, the vessel serving as a container of any liquids that might be produced during a cooking process and also as a support for the tray during the cooking process, said tray embodying supporting protrusions and extended rim sections, the tray and supporting vessel being fitted together when in use as a cooking device, said tray after utilization in a cooking process being disengaged by lifting from the supporting vessel and utilized as a tray or platter holding the cooked food for serving or carving processes.

1 Claim, 5 Drawing Figures

U.S. Patent   Sep. 29, 1981   Sheet 1 of 2   4,291,616
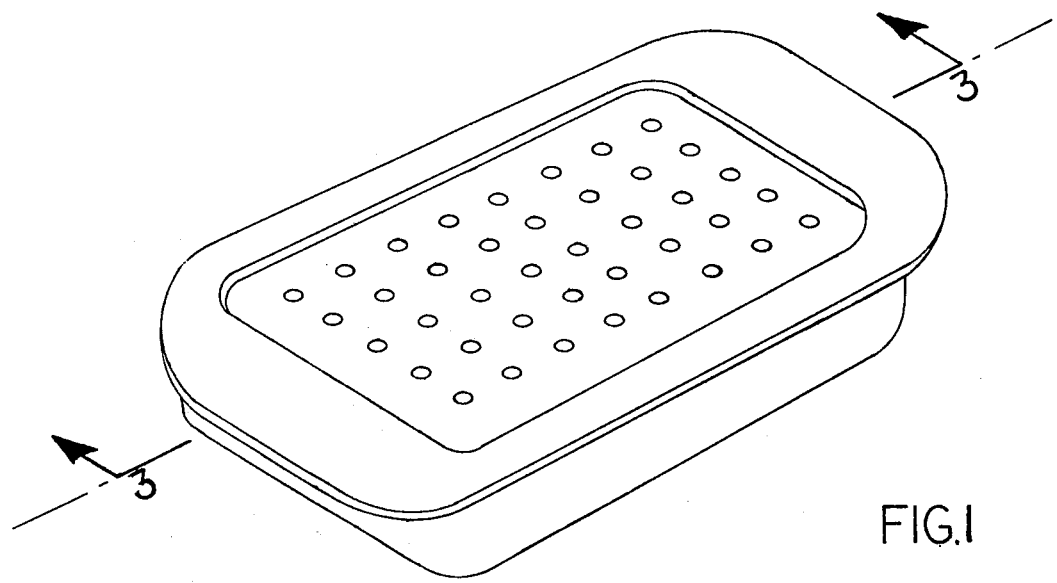
FIG.1
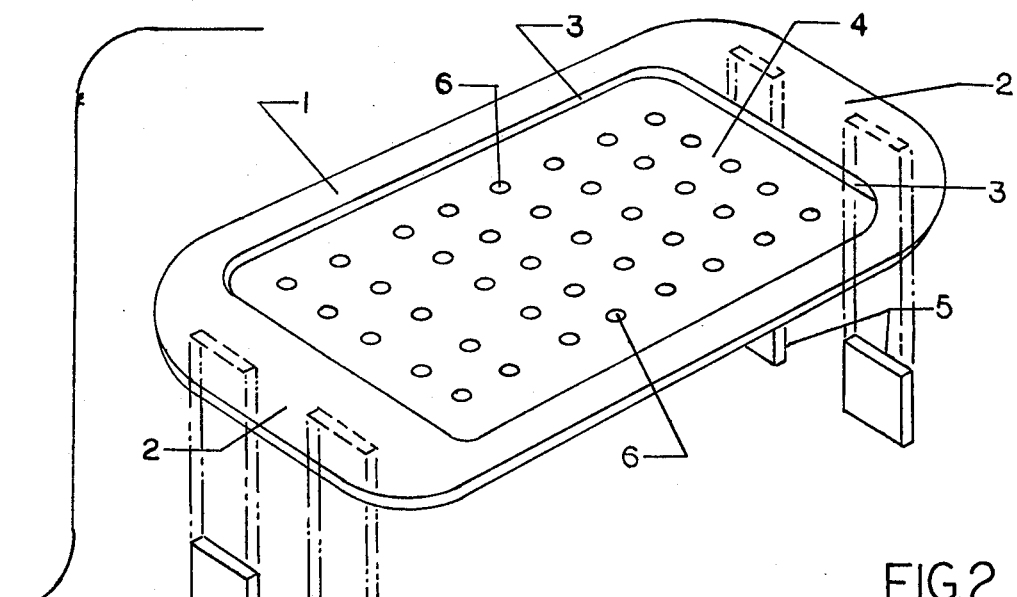
FIG.2
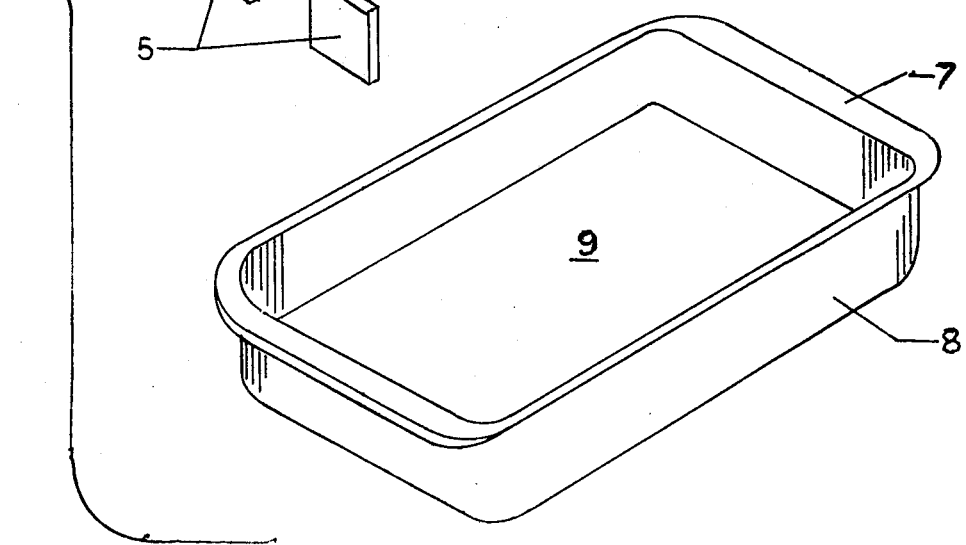

ROASTER TRAY

Many cooks have experienced the extreme difficulties encountered when trying to remove large meat roasts or fowl from conventional roasters and transfer of same to a serving tray or platter. The advantages of my invention in eliminating these difficulties and its additional useful utilizations will become apparent after disclosure and description.

OBJECTS OF INVENTION

One important object of this invention is an improved tray upon which meats, poultry or other foods are supported during a roasting, baking or cooking process.

Another important object of this invention is an improved tray which after use as a support for food in a cooking process, is further utilized as a tray or platter during a serving or carving process, obviating a necessity for transfer of the cooked foods resting thereon to separate receptacles for serving or carving.

Another important object of this invention is an improved tray provided with an aperture or orifices through which any liquids produced in a cooking process are drained into a supporting vessel.

A further object of this invention is the prevention of contact between the bottom wall of the tray and a flat surface upon which it may rest by the provision of protrusions that elevate the underside of the improved tray, the protrusions forming supports upon which the tray rests when being utilized as a carving or serving tray.

Another important object of this invention is a supporting collection vessel utilized as a receptacle for containment of any liquids produced during a cooking process and also as a support for the improved tray during a cooking process, the improved tray being superimposed and resting upon the vessel during a cooking process.

A further important object of this invention is extensions of the rim of the tray that extend outwardly past the periphery of the supporting vessel thereby providing sections of rim equipped with projecting protrusions on the underside and sections serving as handles that may be grasped to facilitate lifting and disengagement of the tray from the supporting vessel.

These and other objects and features along with its incidental advantages will be better understood and appreciated from the following detailed description of several embodiments thereof, selected for the purpose of illustration and shown in the accompanying drawings in which;

FIG. 1 is a perspective view of an improved tray superimposed on a supporting vessel shown and constructed in accordance with this invention.

FIG. 2 is an exploded perspective view of components of this invention in a relative position in an assembled state.

Figure 3:
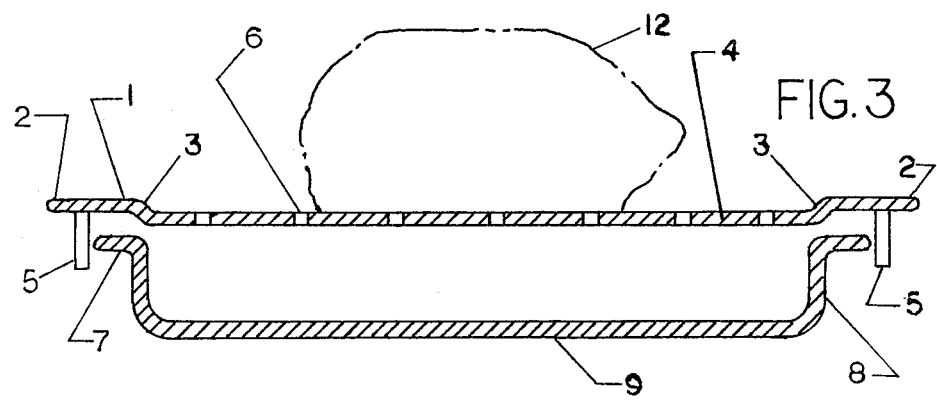
FIG. 3 is a cross-sectional view of assembled components shown in FIGS. 1-2 taken along line 3—3, FIG. 1 in a slightly separated but relative position.

The tray as shown in FIGS. 1-4 has a flat bottom wall 4, vertically inclined side walls 3 extending upward from bottom wall 4 and terminating in a outwardly turned rim 1, further outwardly protruding extended sections 2 of rim 1, supporting protrusions 5 located on the underside of extended sections 2, and apertures 6 located in bottom wall 4.

The supporting vessel shown in FIGS. 2 and 3 has a flat bottom wall 9, vertically inclined side walls 8 terminating in an upper rim 7.

The underside of tray rim 1 rests upon the upper rim 7 of the supporting vessel during the cooking process. The extended sections 2 project horizontally outward beyond the periphery of rim 7 as handles to facilitate lifting and removal of tray from the supporting vessel.

Figure 4:
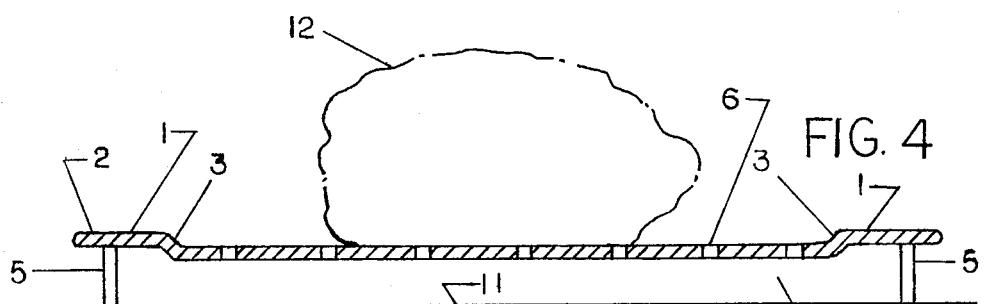
FIG. 4 is a longitudinal cross-section of the improved tray after disengagement from the supporting vessel shown in a subsequent placement upon a flat surface taken along line 3—3 FIG. 1.

The vertically inclined side walls 3 FIGS. 2-4 combine with the bottom wall 4 to form a recessed depression in the tray on which portions of food to be cooked are placed.

Liquids formed during a cooking process drain through apertures 6 FIGS. 2-4 into the supporting pan.

Protrusions 5 FIGS. 2-4 support the tray when tray is placed upon a flat surface 11 FIG. 4, said protrusions being extended downward from the underside of the extended sections 2 a sufficient distance to terminate beyond the plane of bottom wall 4, FIG. 4, thereby providing a space 10 between bottom wall 4 and flat surface 11 FIG. 4, upon which the tray is placed and preventing any accumulation of grease or condensation present on the underside of bottom wall 4 from contacting and soiling the flat surface 11 FIG. 4 upon which the tray is placed. The protrusions 5 are positioned outside the periphery of the supporting vessel to avoid contact and soiling by liquids drained within confines of walls 8 FIGS. 2 and 3 of the supporting vessel.

The supporting vessel FIGS. 2 and 3 has an upper rim 7 that is fitted to conform in shape and size to the underside of rim 1 upon which the tray is supported during a cooking process. Vertically inclined side walls extend downward from rim 7 to a flat bottom wall 9 of the supporting vessel. During a cooking process any liquids produced drain into and accumulate in the supporting vessel.

When a cooking process has been completed, the tray as shown in FIGS. 1-3-4 may be easily grasped by the protruding sections 2 and lifted and disengaged from the supporting vessel and placed on a flat surface 11. Food 12 resting on the tray need not be transferred to another receptacle as the tray serves as a platter, supporting the cooked food 12 resting thereon preparatory to carving or serving.

Liquid produced during a cooking or roasting process is conveniently deposited in the supporting vessel for disposition.

Figure 5:
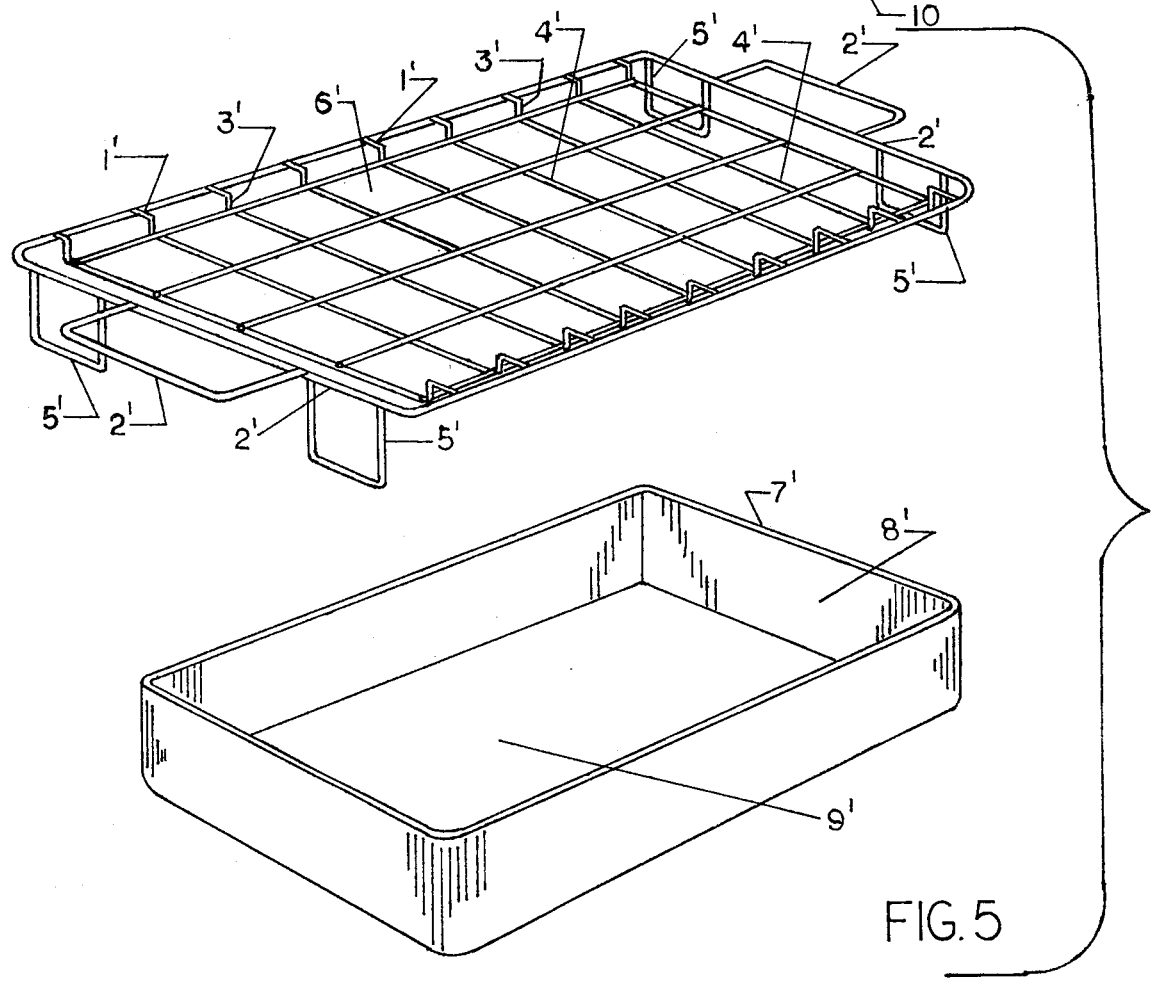
FIG. 5 is an exploded perspective view of components of this invention in a relative position illustrating an embodiment that utilizes a variant in construction materials.

A modification of the cooking tray is shown in FIG. 5. The tray in FIG. 5 being constructed of a wire open framework and similar parts are indicated with the same characters used in FIGS. 1-4 but having a prime mark added thereto.

With the foregoing description, those skilled in the art will appreciate that numerous variations may be made of this invention without departing from its spirit. As an example, although the tray as shown in the drawings is of a modified rectangular shape, alterations changing the general overall shape to oval or round or combinations of variations in shape might be used and changes in size, shape, or number or arrangement of perforations or apertures might be utilized without departing from the spirit of this invention.

It is the intent of the inventor that the materials from which this invention may be manufactured may be varied to include, but not limited to glass, sheet metals, wires, rods, cast metals and/or combinations of suitable rigid materials and that manufacturing processes involved might include but are not limited to forming by stamping, casting, bending, welding and pressing of materials.

What is claimed is:

1. A utensil adapted for use in both the cooking and serving of meats or other foods comprising a lower supporting vessel and an upper tray which is adapted to sit on top of said vessel, said tray including a perforated food surface equal in area to the vessel on which it rests, the tray further including protruding side and end portions which extend over and overlap upper edges of said vessel, said tray including sidewalls between said perforated surface and said portions so as to form a food holding cavity, the tray end portions further including downwardly extending support protrusions which extend down and closely adjacent the outside of the vessel walls when food is being cooked and which function as support legs therefor when removed from the vessel, the protrusions extending well within the confines of said tray portions and closely adjacent said vessel outside walls so as to prevent lateral movement of the tray when positioned on top of said vessel.

* * * * *